United States Patent [19]

Benzing et al.

[11] Patent Number: 4,542,487
[45] Date of Patent: Sep. 17, 1985

[54] METHOD AND APPARATUS FOR SHEAR WAVE LOGGING

[75] Inventors: William M. Benzing, Oklahoma City; Waldo C. Patterson; Lawrence C. Cadle, both of Ponca City, all of Okla.

[73] Assignee: Conoco Inc., Ponca City, Okla.

[21] Appl. No.: 440,980

[22] Filed: Nov. 12, 1982

[51] Int. Cl.$^4$ .............................................. G01V 1/40
[52] U.S. Cl. ...................................... 367/31; 181/112; 367/48; 367/75; 367/911
[58] Field of Search ....................... 367/25, 31, 35, 48, 367/57, 75, 911, 178, 180; 181/102, 104, 108, 122, 401, 112

[56] References Cited

U.S. PATENT DOCUMENTS 3,344,881 10/1967 White ................................ 367/48
3,354,983 11/1967 Erickson et al. ...................... 367/75
3,475,722 10/1969 White ............................... 367/911

Primary Examiner—Salvatore Cangialosi
Assistant Examiner—K. R. Kaiser
Attorney, Agent, or Firm—William J. Miller

[57] ABSTRACT

Apparatus for shear wave logging of formations adjacent a borehole wherein a tubular apparatus is specifically constructed for sympathetic movement with the borehole in response to low frequency horizontal shear waves. The apparatus consists of tubular frame structure with end members including housings for rigid seating of orthogonal pairs of horizontal wave detectors. Outer sleeve structure may be utilized for buoyancy adjustment.

6 Claims, 5 Drawing Figures

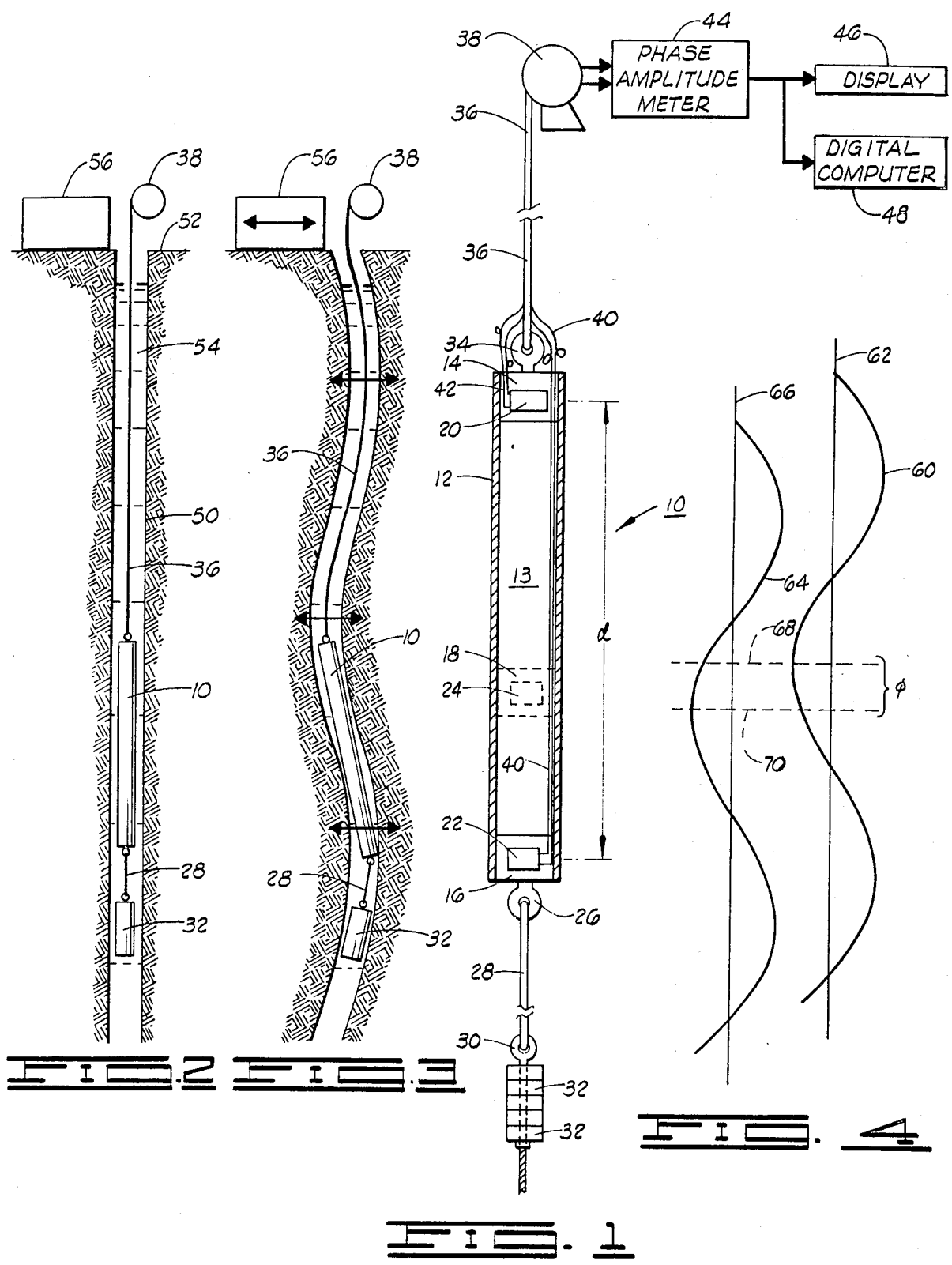

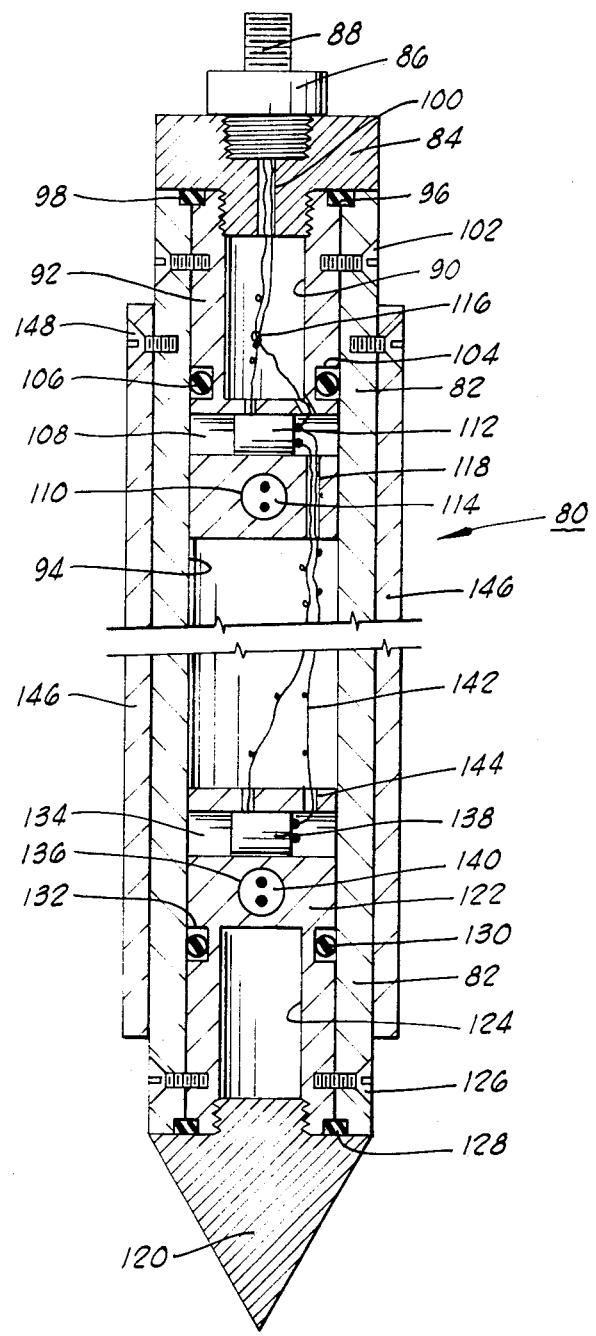

METHOD AND APPARATUS FOR SHEAR WAVE LOGGING

CROSS-REFERENCE TO RELATED APPLICATION

This application is a related case to U.S. Application Ser. No. 168,055 as filed on July 14, 1980 and entitled "Method and Apparatus for Shear Wave Logging", now U.S. Pat. No. 4,369,506 as issued on Jan. 18, 1983.

BACKGROUND OF THE INVENTION

1. Field of the Invention

The invention relates generally to shear wave acoustic logging of boreholes and, more particularly, but not by way of limitation, it relates to an improved method and apparatus for obtaining shear wave data utilizing longer wavelength source frequencies.

2. Description of the Prior Art

The prior art includes numerous types of shear wave logging tool as they have been used for a number of years in obtaining shear wave data from a borehole in the earth's surface. Shear wave generation sources have been utilized both from a position on the earth's surface adjacent the borehole and from the logging tool itself, i.e. the source is an integral part of the tool. In most prior art shear wave applications the generation source has been controlled within higher frequency ranges, e.g. 10–15 kilohertz, and both shear wave source and detectors were positioned in close coupling contact with the borehole wall in order to provide optimum detection of the shear wave energy. The prior art applications tended toward higher frequency source energies which tended to see the well bore from a microscopic point of view in that a relatively small portion of the well adjacent to the logging tool is seen to vibrate under the influence of those shear wave vibrations whose wavelength is smaller than the bore diameter. Due to this then, depth of penetration or examination by the acoustic waves is limited to the rock structures closely surrounding the borehole.

SUMMARY OF THE INVENTION

The present invention relates to an improved method and apparatus for obtaining subsurface shear wave velocities. The invention utilizes longer wavelengths at lower frequencies and, therefore, gives a better representation of the rock properties at a greater distance away from the potentially disturbed well bore. Thus, the tool of the present invention sees the well bore from a macroscopic point of view in that the entire well bore is visualized as oscillating under the influence of transverse horizontal shear wave vibrations whose wavelength is large compared to the well bore diameter. The invention utilizes a sensor or tubular tool that is designed to move sympathetically with the vibrating borehole to thus give a true representation of the downward traveling shear wave that causes the borehole to oscillate. The tool includes two or more horizontal geophone pairs, each pair oriented at 90° displacement, and the tool is filled with air to provide for weight adjustability relative to the borehole fluid. Horizontal shear waves are then generated at the surface in the 10–300 hertz range such that the mono-frequency shear wave disturbance traveling past the sensors may be detected and phase compared to obtain an indication that relates to the velocity of shear wave travel in the earth adjacent the borehole.

Therefore, it is an object of the present invention to provide a method of obtaining more reliable shear wave velocity data relative to a fluid-filled borehole and the surrounding strata.

It is also an object of the present invention to provide an improved type of shear wave detection tool which is sympathetic to the contortional movements of the borehole when under shear wave stresses.

It is yet another object of this invention to provide a borehole shear wave detector which provides greater indication of shear wave velocity through a greater volume of the surrounding earth structure.

Finally, it is an object of the present invention to generate and detect lower frequency horizontal shear waves which convey more accurate data relative to the rock properties of the surrounding strata.

Other objects and advantages of the invention will be evident from the following detailed description when read in conjunction with the accompanying drawings which illustrate the invention.

BRIEF DESCRIPTION OF THE DRAWINGS

FIG. 1 is a partial block and schematic illustration of the logging tool and surface processing equipment of the present invention;

FIG. 2 is a view in idealized form of a shear wave logging tool suspended in a borehole formed in the earth's surface;

FIG. 3 is an idealized view of the shear wave logging tool and borehole when under stress due to generation of horizontal shear waves at the surface;

FIG. 4 illustrates the phase relationship of detected horizontal shear waves; and FIG. 5 is a vertical section of a particular logging sonde structure for utilization in the present invention.

DETAILED DESCRIPTION OF THE INVENTION

FIG. 1 illustrates schematically a logging tool 10 as it would be suspended in operative association with a borehole structure. The tool 10 consists primarily of a selected size of metal tubing 12 defining an internal cavity 13 and having the upper and lower ends sealingly closed by geophone housings 14 and 16, respectively. Optionally, additional spaced horizontal geophone housings, such as housing 18, may be utilized to provide additional shear wave data output.

The geophone housings such as 14, 16 are a standard form of sealed structure for containing conventional types of horizontally polarized geophone 20 and 22 in proper attitude and support for detecting horizontal wave motion. Any additional geophones 24 will be similarly mounted at selected spacing and provided with necessary electrical connection to the surface processing equipment. The lowermost geophone housing 16 includes an eye bolt suitably affixed therebeneath, as by welding, in adaptation to receive a cable 28 which, in turn, is connected to an anchor bolt 30 for receiving a selected plurality of weights 32.

Upper geophone housing 14 is similarly secured to an eye bolt 34 which serves for affixure of suspension cable 36 extending down the borehole from a suitable surface winch 38. Detected output from geophone 22 may be conducted via leads 40 and up through suspension cable 36 as is common practice using standard logging cable. In like manner, geophone 20 is provided with surfaceconnecting leads 42 and similar leads would be provided for additional geophones, such as an optionally employed geophone 24.

Electrical outputs from the geophones are then taken off of logging cable 36 for input to a phase amplitude meter 44 which provides further output to a display 46 and/or suitable digital computer or microprocessor circuitry 48. There are various forms of suitable phase amplitude meter 44 which are commercially available; however, present application utilizes a phase amplitude meter as manufactured by Hewlett-Packard Corporation of Palo Alto, Calif. Output display 46 may take any of the various forms utilized in geophysical field work such as photographic, chart recorder and other equivalents.

Referring now to FIG. 2, there is illustrated a borehole 50 as formed in earth surface 52 and filled with fluid 54, i.e. water, mud or the like. The shear wave tool 10 is then suspended from a suitable winch 38 by logging cable 36 and positioned downhole adjacent selected strata. A horizontal shear wave source 56 may then be coupled on the earth's surface 52 proximate to or within the borehole 50. Referring also to FIG. 3, an exaggerated illustration, the shear wave source 56 is energized at a selected frequency within the range of 10–300 hertz, frequencies having wavelengths much longer than the characteristic dimensions of the borehole 50, and the tendency is to cause a contortion of the borehole as indicated. The horizontal shear wave source 56 may be any suitable form of controlled frequency source such as a vibrator or the like which provides reliable frequency of energy input to the earth surrounding the borehole.

FIG. 4 illustrates the manner in which horizontal geophones 20 and 22 located at spacing d (FIG. 1) generate phase-displaced signal outputs for comparison by phase amplitude meter 44. Thus, geophone 20 detects horizontal shear wave signal 60 as shown on base line 62, and the lower or more remote geophone 22 detects a shear wave signal 64 as shown on base line 66 in phase displaced relationship. Thus, the phase delay ∅, as illustrated by dash lines 68, 70, provides a quantity which can be directly related to shear wave velocity in the surrounding medium when the frequency of propagation is known. Should additional geophones 24 or the like be employed, similar phase differentials can be derived by phase amplitude meter 44 for comparison to other data and further verification of the shear wave velocity in the surrounding medium.

In operation, the cavity 13 is maintained air-filled in order to achieve a selected buoyancy characteristic which will allow the non-coupled tool 10 to be suspended for movements sympathetic to the vibrational contortions of borehole 50, thereby to achieve maximum detector output and more concise signal phase definition. The buoyancy caused by air-filled cavity 13 is then offset to achieve a near neutral buoyancy in the borehole fluid by addition of a selected number of weights 32 on anchor bolt 30. The number and size of weights will depend upon the density of the borehole fluid and the conditions of the borehole fluid and the borehole wall. The weight 32 and tool assembly 10 is then lowered into the borehole as suspended by cable 36 to a designated depth and the horizontal shear wave source 56 is operated to provide shear wave input to the earth and propagation through the medium surrounding the borehole. The motion of the vibrating borehole is then sensed by two or more horizontal geophones 20, 22 as spaced apart by a distance d with output of the sensed voltage indication transmitted up to phase amplitude meter 44 at the surface station. For any continuous, monofrequency shear wave disturbance traveling past the sensor, the output frequency of the geophones will be identical except that a phase difference ∅ will be seen between the two geophone outputs, as shown in FIG. 4. This phase difference is given by the well known expression:

$$\emptyset = 2\pi/\lambda \cdot d$$

where ∅ is the phase angle difference between the geophone outputs of geophone 20 and 22, λ is the wavelength of the downward traveling shear wave, and d is the spacing between the geophones. Thus, by measuring the difference in phase and knowing the spacing d, the wavelength of the shear wave can be readily determined. Thereafter, frequency f being known, the actual shear wave velocity V is terminable by simple conversion using:

$$V = f\lambda.$$

The logging tool may be intermittently lowered to successively deeper strata along the borehole 50, each time energizing the shear wave source 56 and analyzing the detected shear wave data through phase amplitude meter 44 to detect phase difference. The digital phase difference output may then be applied to display 46 as well as computer 48, e.g. a simple microprocessor, to effect shear velocity conversion and subsequent recording, e.g. as shear wave velocity log.

FIG. 5 illustrates a particular type of logging sonde 80 that is effective for use in the manner of the present invention. The sonde 80 is formed by a length of cylindrical tubing 82 as formed from steel and having sufficient wall thickness to enable fastener gripping. The upper end of tubing 82 is sealingly closed off by an end cap 84 that is securely affixed as by threads to a logging tool head member 86. The logging tool head 86 is of conventional type and adapted to be attached to a standard wire line or logging cable as by threaded post 88. The end plug 84 is threadedly secured within a central bore 90 of a cylindrical geophone housing member 92 that is adapted to be closely received within the central bore 94 of frame tubing 82. Alternatively, the end cap 84 and housing member 92 may be unitarily formed. Peripheral packing or sealing member 96 is disposed within a suitable seating 98 about the upper, inner circumfery of frame tubing 82 in coactive engagement with the outer circumfery of geophone housing 92. An axial bore 100 is formed through end plug 84 to allow passage of conduits between the logging cable and transducing members within the sonde 80. The geophone housing 92 is maintained in secure engagement within frame tubing 82 by means of a plurality of setscrew type fasteners 102 spaced about the periphery of frame tubing 82.

A circumferential groove 104 is disposed around geophone housing 92 to receive an O-ring type seal 106 seated therein and providing a pressure seal adjacent the inner circumfery of frame tubing 82. Further internally from seal 106 there are formed first and second transverse bores 108 and 110 in close proximity but disposed at 90° each to the other. First and second horizontal geophones 112 and 114 are then disposed in respective bores 108 and 110 in parallel orthogonal disposition.

Each of horizontal geophones 112 and 114 is connected by wire conductor, shown generally as connectors 116, to convey data uphole to the surface control and processing station. Suitable feed-through bores, e.g. bore 118, are provided through internal components along the sonde to allow interconnection.

The lower end of sonde 80 includes a similar formation consisting of a bottom nose cone 120 in combination with a lower geophone housing 122. The nose cone 120 may be screw fastened within a threaded bore 124 formed axially in geophone housing 122, and the entire assembly is maintained in secure placement by a plurality of set-type screw fasteners 126 surrounding the frame tubing 82. Here again, cone 120 and housing 122 may be unitarily formed. A sealing member 128 is peripherally seated about the lower end of frame tubing 82, and an O-ring seal 130 within a circumferential groove 132 provides pressure seal for the interior of sonde 80. Above seal 130 there are disposed third and fourth bores 134 and 136 formed in parallel orthogonal disposition through geophone housing 122 in order to receive horizontal geophones 138 and 140 securely therein. Electrical connection of lower geophone 138 and 140 is made by conventional wire interconnection such as connectors 142 and feed-through bores 144. The individual geophones may be secured in their respective bores by means of suitable bonding agent, potting compound or the like so long as they are held tightly in horizontal attitude for vibration sensing.

The internal cavities of sonde 80 are air-filled and maintained in sealed disposition. Therefore, buoyancy off-set weighting may be carried out by such as an external cylindrical sleeve 146 that is slidable over the outer circumfery of frame tubing 82 and securely fastened thereon by means of a plurality of circumferentially spaced set-type screw fasteners 148. The weighting sleeve 146 may be formed from such as steel to be of preselected length and wall thickness so as to impart a specified counterweight. Weighting sleeves 146 may be varied in accordance with the exigencies of the particular logging operation. Also, weighting may be effected in the manner shown in FIG. 1. Of course, in accordance with the practice of the present invention, it is desirable for sonde 80 to be of relatively long length in order to enable sufficient phase displacement as between waves detected at the upper and lower geophone pairs. Also, it is contemplated that three or more geophone pairs in respective housing members may be disposed along a sonde frame to enable particular specialized logging effects.

The foregoing discloses a novel form of shear wave detection tool which can exhibit a selected degree of buoyancy within a borehole fluid, and which does not require hydraulic or electric packer equipment and/or actuatable extensors for coupling the detection apparatus to the borehole wall. In particular, the sonde design allows for more accurate sensing of borehole flexure during shear wave propagation as the sonde moves sympathetically with the borehole wall. The orthogonally disposed horizontal geophone pairs are effective to detect shear waves and to give a true representation of downward traveling wave energy as the borehole oscillates.

It should be understood that changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for shear wave detection along a defined earth borehole, comprising:
    elongated cylindrical tube means of rigid material;
    logging cable means providing movable suspension of said tube means in said borehole;
    upper end cap means secured sealingly on one end of said tube means and being secured to said cable means;
    upper geophone housing means secured to said end cap means and extended into sealed seating within said tube means, said housing means having first and second transverse orthogonal bores formed in juxtaposition;
    lower end cone means secured sealingly on the opposite end of said tube means;
    lower geophone housing means secured to said end cone means and extended into sealed seating within said tube means, said housing means having third and fourth transverse orthogonal bores formed in juxtaposition; and
    a respective horizontal wave motion detector securely disposed in each of the first, second, third and fourth bores.

2. Apparatus as set forth in claim 1 which is further characterized to include:
    weighting means for off-setting buoyancy effects within the tube means.

3. Apparatus as set forth in claim 2 wherein said weighting means comprises:
    tubular sleeve means slidable over and secured on said tube means, said sleeve means being of selected specific gravity, length and wall thickness.

4. Apparatus as set forth in claim 1 which is further characterized to include:
    means within said logging cable means for conducting outputs from respective individual detectors to a surface position for signal processing.

5. Apparatus as set forth in claim 1 which further includes:
    means conducting electrical output from said first, second, third and fourth detectors and analyzing to determine and output horizontal shear wave phase difference versus known travel distance.

6. Apparatus as set forth in claim 1 wherein:
    said upper end cap means and upper geophone housing means are of unitary formation; and
    said lower end cone means and lower geophone housing means are of unitary formation.

* * * * *